United States Patent
Petricek

(10) Patent No.: US 12,007,493 B2
(45) Date of Patent: Jun. 11, 2024

(54) TECHNICAL STAGE DEVICE AND METHOD FOR DETERMINING A CORRELATION FUNCTION

(71) Applicant: zactrack GmbH, Vienna (AT)

(72) Inventor: Werner Petricek, Kierling (AT)

(73) Assignee: zactrack GmbH, Vienna (AT)

( * ) Notice: Subject to any disclaimer, the term of this patent is extended or adjusted under 35 U.S.C. 154(b) by 407 days.

(21) Appl. No.: 17/424,914

(22) PCT Filed: Jan. 9, 2020

(86) PCT No.: PCT/EP2020/050414
§ 371 (c)(1),
(2) Date: Jul. 22, 2021

(87) PCT Pub. No.: WO2020/151955
PCT Pub. Date: Jul. 30, 2020

(65) Prior Publication Data
US 2022/0091217 A1    Mar. 24, 2022

(30) Foreign Application Priority Data

Jan. 24, 2019    (AT) .............................. A 50055/2019

(51) Int. Cl.
*G01S 3/785*    (2006.01)
*G03B 15/07*    (2021.01)
(Continued)

(52) U.S. Cl.
CPC .............. *G01S 3/785* (2013.01); *G03B 15/07* (2013.01); *G12B 13/00* (2013.01); *H04N 23/51* (2023.01)

(58) Field of Classification Search
CPC . G01S 3/785; G01S 3/786; G01S 5/16; G03B 15/07; G03B 5/00; G12B 13/00;
(Continued)

(56) References Cited

U.S. PATENT DOCUMENTS 8,300,219 B1    10/2012    Gordin et al.
9,157,795 B1 *  10/2015    Linnell ..................... A63J 5/02
(Continued)

FOREIGN PATENT DOCUMENTS

EP    0814344    12/1997
JP    04-62703    2/1992
(Continued)

OTHER PUBLICATIONS

Internationaler Recherchenbericht und Schriftlicher Bescheid [International Search Report and the Written Opinion] dated Apr. 17, 2020 From the International Searching Authority Re. Application No. PCT/EP2020/050414 and Its Translation of Search Report Into English. (13 Pages).
(Continued)

*Primary Examiner* — Tarifur R Chowdhury
*Assistant Examiner* — Carlos Perez-Guzman

(57) ABSTRACT

The invention relates to a technical stage device (1), comprising a fastening element (2), a bearing element (3) and a functional element (4), in particular a camera or a spotlight, wherein the functional element (4) is arranged on the bearing element (3) so as to be pivotable about a tilt axis (14) and wherein the bearing element (3) is arranged on the fastening element (2) so as to be rotatable about a pan axis (13), wherein a position determination arrangement is provided, which is designed in such a way that a relative movement between the bearing element (3) and the fastening element (2) as well as between the bearing element (3) and the functional element (4) can be determined. Further, the invention relates to a method for determining the correlation function of predetermined tilt and pan values of a functional value (4), in particular a camera or a spotlight, to absolute motion values of the functional element (4).

12 Claims, 2 Drawing Sheets

(51) Int. Cl.
*G12B 13/00* (2006.01)
*H04N 23/51* (2023.01)

(58) Field of Classification Search
CPC ...... H04N 23/51; H04N 23/00; G06F 3/0346; A63J 5/00; H05B 31/0036
See application file for complete search history.

(56) References Cited

U.S. PATENT DOCUMENTS

| | | | | |
|---|---|---|---|---|
| 2012/0306427 | A1* | 12/2012 | Kagei | F16M 11/18 318/638 |
| 2013/0136456 | A1* | 5/2013 | Yoo | H04B 10/116 398/118 |
| 2016/0323504 | A1 | 11/2016 | Ono | |
| 2018/0292809 | A1 | 10/2018 | Farnik et al. | |

FOREIGN PATENT DOCUMENTS

| | | |
|---|---|---|
| WO | WO 2012/051715 | 4/2012 |
| WO | WO 2013/102273 | 7/2013 |
| WO | WO 2017/008023 | 1/2017 |
| WO | WO 2020/151955 | 7/2020 |

OTHER PUBLICATIONS

Vorbescheid und Recherchenbericht [Preliminary Decision and Search Report] dated Jan. 10, 2020 From the Oesterrisches Patentamt [Austrian Patent Office] Re. Application No. A50055/2019. (4 Pages).

\* cited by examiner

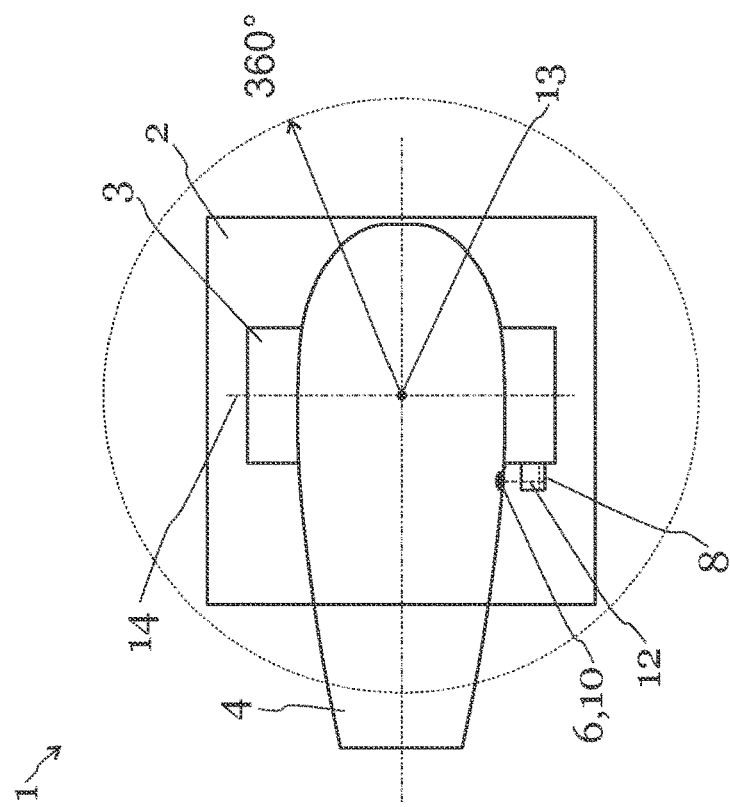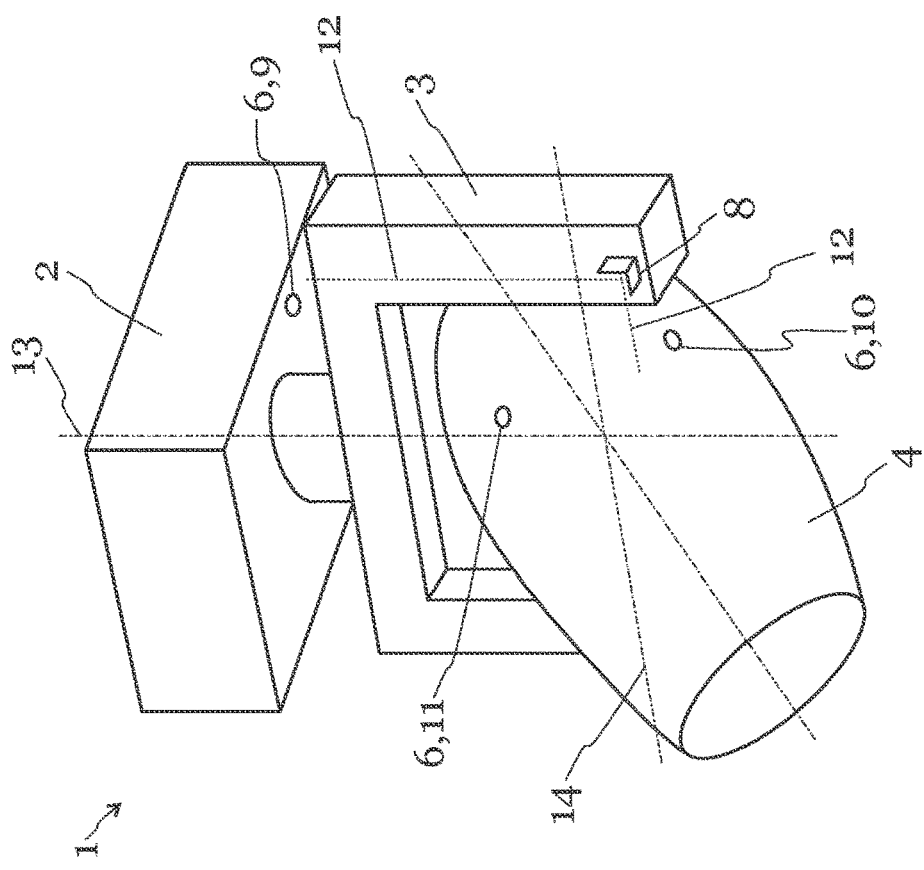

TECHNICAL STAGE DEVICE AND METHOD FOR DETERMINING A CORRELATION FUNCTION

RELATED APPLICATIONS

This application is a National Phase of PCT Patent Application No. PCT/EP2020/050414 having International filing date of Jan. 9, 2020, which claims the benefit of priority of Austrian Patent Application No. A50055/2019 filed on Jan. 24, 2019. The contents of the above applications are all incorporated by reference as if fully set forth herein in their entirety.

FIELD AND BACKGROUND OF THE INVENTION

The invention relates to a technical stage device, comprising a fastening element, a bearing element and a functional element, in particular a camera or a spotlight, wherein the functional element is arranged on the bearing element so as to be pivotable about a tilt axis and wherein the bearing element is arranged on the fastening element so as to be rotatable about a pan axis.

In the field of stage and event technology, rotary and pivotal elements are used to be able to manipulate the position of functional elements such as cameras or spotlights. For example, it is known from the prior art to arrange a spotlight as a functional element in a rotatable and pivotable manner in such a way that it can be directed at substantially any point in a room, for example on a stage. Typically, this is enabled by pivotably mounting the functional element on a bearing element and by rotatably mounting the bearing element on a fastening element.

In the prior art the rotational axis is usually referred to as pan axis and the pivot axis as tilt axis, wherein the pan axis and the tilt axis may in particular extend orthogonal to one another.

The drive is usually provided by stepper motors, wherein the individual steps are referred to as ticks. In order to be able to adjust the position of the functional element as precisely as possible, it is necessary to know how the motor movement in pan ticks/tilt ticks influences the actual movement and orientation of the functional element.

Thus, the correlation function/mapping assignment describing the relationship between motor control and actual positioning of the functional element has to be determined. This relationship is regularly determined purely empirically and varies depending on the set-up of a technical stage device, which might lead to inaccuracies in the orientation of the functional element. To remedy these inaccuracies, a fine adjustment is necessary whenever the location of the technical stage device changes; this can be very labour intensive.

Thus, an object of the invention is to overcome the disadvantages of the prior art and to create a device and a method with which the relationship between motor control and actual positioning of the functional element can be determined reliably.

The object of the invention is solved by a device and a method with the features of the independent patent claims.

SUMMARY OF THE INVENTION

The invention relates to a rotatable and pivotable technical stage device, comprising a fastening element, a bearing element and a functional element, wherein the functional element is arranged on the bearing element so as to be pivotable about a tilt axis and wherein the bearing element is arranged on the fastening element so as to be rotatable about a pan axis. The functional element may in particular be a camera or a spotlight.

The terms "rotatable", "pivotable" and any variations thereof may, in the context of the present invention, refer to the ability of an element to move about a substantially stationary axis. In particular, the pan axis and the tilt axis may extend orthogonal to one another.

According to the invention, the position determination arrangement is designed in such a way that a relative movement between the bearing element and the fastening element as well as between the bearing element and the functional element can be determined.

On the fastening element, the bearing element may be rotatable by at least 360°, preferably 540°, about the pan axis. On the bearing element, the functional element may be pivotable by at least 90°, preferably 180°, about the tilt axis. This allows the functional element to be directed at any point located on the surface of a half shell of a sphere.

According to the invention, the position determination arrangement may be designed in such a way that a rotation or pivoting of the functional element can be determined. In particular, it may be provided that a signal transmitted by a signal transmitting element is reflected by a signal reflecting element only in a certain position of the functional element in such a way that it hits the corresponding signal receiving element.

Optionally, it may be provided that the position determination arrangement comprises at least two signal transmitting elements, at least two signal reflecting elements and at least two signal receiving elements.

Optionally, it may be provided that the signal transmitting elements are designed to transmit electromagnetic radiation, in particular infrared radiation, visible light radiation or UV radiation. Optionally, the signal transmitting element may be designed as a light-emitting diode. Optionally, the signal transmitting element may be a laser. The signal transmitting element may also be any element or device capable of transmitting a signal. A signal can in particular be of an optical nature, i.e. electromagnetic radiation, preferably in the ultraviolet, visible or infrared range.

A signal reflecting element according to the invention may in particular be designed in such a way that it can reflect the signal transmitted by a signal transmitting element. In case the signal is an optical signal, the signal reflecting element may be a mirror.

A signal receiving element according to the invention may be designed in such a way that it can detect incoming signals, in particular signals coming from the signal transmitting element. In case the signal is an optical signal, the signal receiving element may be a photodiode, for example.

Optionally, it may be provided that the signal transmitting elements are arranged in such a way that the propagation directions of the signals transmitted by the signal transmitting elements are substantially orthogonal to one another and preferably extend in the direction of the pan axis and the tilt axis.

Optionally, it may be provided that a first signal reflecting element is arranged on the fastening element. Optionally, it may be provided that a second signal reflecting element and, optionally, a third signal reflecting element are arranged on the functional element.

Depending on the ability of the functional element to rotate and pivot, it may be necessary to provide a corresponding number of signal reflecting elements. Preferably, the signal reflecting elements are arranged on the housing of the technical stage device.

Optionally, it may be provided that a transceiver apparatus is provided, wherein the transceiver apparatus comprises at least two signal transmitting elements and at least two signal receiving elements. Preferably, the signal transmitting elements and the signal receiving elements may be arranged in a combined assembly, in particular a transceiver apparatus. This allows the position of the elements relative to one another to be fixed. In addition, easy installation on a technical stage device is made possible.

Optionally, it may be provided that the transceiver apparatus is arranged on the bearing element. The combined transceiver apparatus may comprise a first signal transmitting element and an associated first signal receiving element for cooperating with a first signal reflecting element on the fastening element. The combined transceiver apparatus may further comprise a second signal transmitting element and an associated second signal receiving element for cooperating with a second signal reflecting element on the functional element.

Optionally, it may be provided that the bearing element is movable relative to the fastening element exclusively in the pan axis. Optionally, it may be provided that the functional element is movable relative to the bearing element exclusively in the tilt axis.

Further, the invention relates to a method for determining the correlation function of predetermined tilt and pan values of a functional element, in particular a camera or a spotlight, to absolute motion values of the functional element by using a device according to the invention. The method according to the invention comprises the following steps:
  a. Moving the functional element into a first position, wherein in the first position the signal of at least one signal transmitting element is reflected by at least one signal reflecting element to at least one signal receiving element,
  b. Moving the functional element by rotating it about the pan axis and/or pivoting it about the tilt axis into a second position defined by predetermined tilt and pan values, wherein in the second position the signal of at least one signal transmitting element is reflected by at least one signal reflecting element to at least one signal receiving element,
  c. Measuring at least one absolute motion value of the functional element between the first position and the second position,
  d. Determining a correlation function between the predetermined tilt and pan values of the functional element and the actually measured motion value of the functional element.

Preferably, the path/angle between the first position and the second position of the functional element is known.

Optionally, it may be provided that the first position corresponds to the second position.

Optionally, it may be provided that, for determining the absolute motion value of the pan axis, a rotation of the functional element about the pan axis, in particular by 360°, takes place.

Optionally, it may be provided that, for determining the absolute motion value of the tilt axis, a rotation of the functional element about the tilt axis, in particular by 90°, takes place.

Further features of the invention become apparent from the patent claims, the figures and the exemplary embodiment.

In the following, the invention is discussed in detail on the basis of an exemplary embodiment. The exemplary embodiment is merely illustrative and is not intended to limit the scope of the invention.

BRIEF DESCRIPTION OF THE SEVERAL VIEWS OF THE DRAWINGS

In the figures:

FIG. 1 shows a schematic perspective view of an exemplary embodiment of a technical stage device according to the invention;

FIG. 2 shows a plan view of the technical stage device according to the exemplary embodiment;

DESCRIPTION OF SPECIFIC EMBODIMENTS OF THE INVENTION

Figure 4:
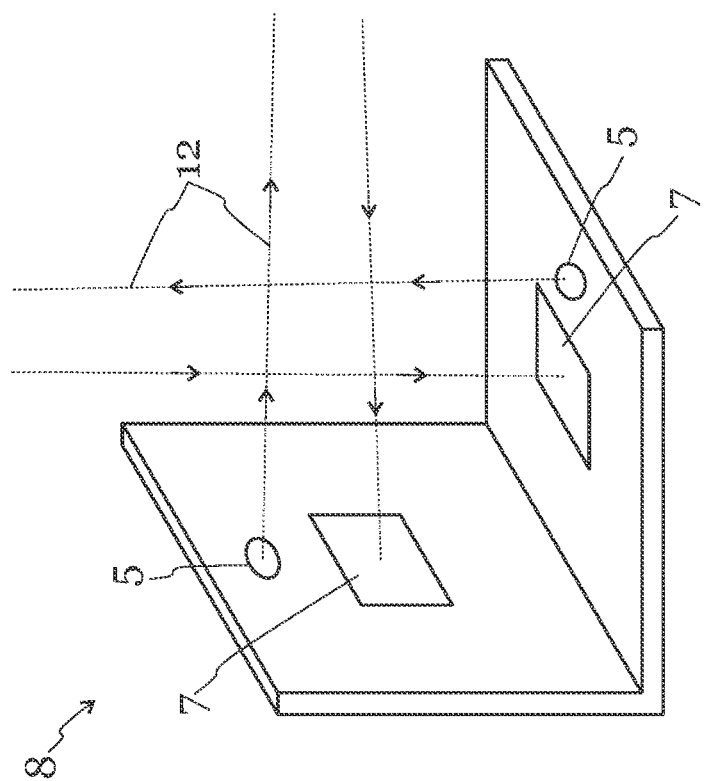
FIG. 4 shows a detailed view of the transceiver apparatus of the exemplary embodiment.

FIG. 1 shows a schematic perspective view of an exemplary embodiment of a technical stage device 1 according to the invention.

The technical stage device 1 comprises a fastening element 2, a bearing element 3 and a functional element 4, which in this exemplary embodiment is designed as a spotlight.

The fastening element 2 is configured to fasten the technical stage device 1 to a surface. In this exemplary embodiment, the surface is the ceiling of a room in which the technical stage device 1 is used. Alternatively, the fastening element 2 can be used to fasten the technical stage device 1 to other surfaces, e.g. walls or floors. The fastening can be done with means known in the prior art, e.g. screws or bolts. In particular when positioned on a floor, the fastening element 2 can also be designed as a stand or have a stand.

On the fastening element 2, the bearing element 3 is mounted so as to be rotatable about the pan axis 13. In case the technical stage device 1 is positioned as in the exemplary embodiment described, the orientation of the pan axis 13 is vertical. The bearing element 3 is rotatable about the pan axis 13 by at least 360°. However, a rotatability of more than 540° is usually not provided in order to avoid tangling of cable connections.

On the bearing element 3, the functional element 4 is mounted so as to be pivotable about the tilt axis 14. In case the technical stage device 1 is positioned as in the exemplary embodiment described, the orientation of the tilt axis 14 is horizontal. The functional element 4 can be pivoted by about 180°.

Thus, by rotating about the pan axis 13 and pivoting about the tilt axis 14, the functional element 4 may be directed at any point located on the surface of a hemispherical shell. In FIG. 1 the functional element 4 is pivoted by about 45° to the horizontal.

On the bearing element 3, a transceiver apparatus 8 is arranged, which, in this exemplary embodiment, comprises two signal transmitting elements 5 and two signal receiving elements 7.

In addition to the signal transmitting element 5 and the signal receiving element 7, the position determination arrangement according to the invention also comprises signal reflecting elements 6, wherein a first signal refection element 9 is arranged on the fastening element 2 and wherein a second signal reflecting element 10 and a third signal reflecting element 11 are arranged on the functional element 4.

In this exemplary embodiment, the signal reflecting elements 6 according to the invention are designed as mirrors. It is understood that the signal reflecting elements 6 are arranged in such a way that they allow a reflection of the signal transmitted by the respective signal transmitting element 5 to the corresponding signal receiving element 7. However, in other exemplary embodiments, which are not shown, the signal reflecting elements 6 may be designed in any way as long as they are capable of reflecting the signal of a signal transmitting element 5 in a suitable manner.

In this example, the transceiver apparatus 8 transmits a light signal. It propagates in the propagation directions 12 towards the fastening element 2 and the functional element 4. In this view, neither the fastening element 2 nor the functional element 4 is in a reflection position; hence, the signal is not reflected back to the transceiver apparatus 8 by any of the signal reflecting elements 6. Thus, the light signal hits the surface of the technical stage device 1.

Figure 3:
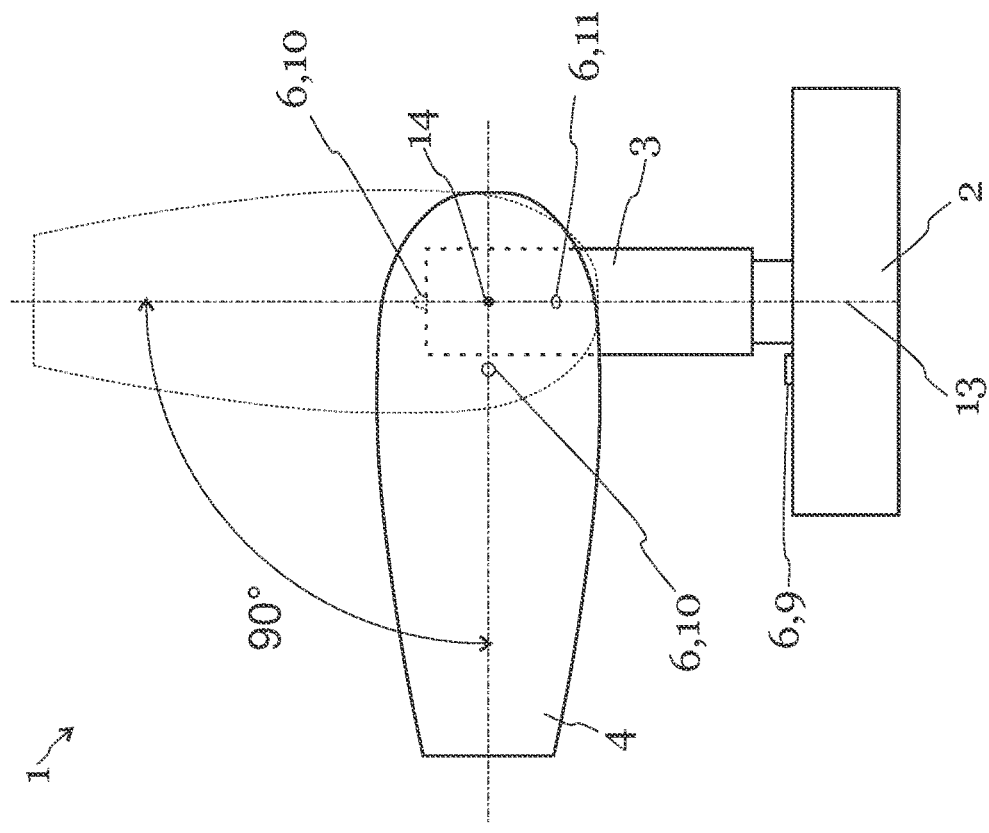
FIG. 3 shows a lateral view of the technical stage device according to the exemplary embodiment.

FIG. 2 shows a plan view of the technical stage device of the exemplary embodiment and FIG. 3 shows a lateral view of the technical stage device of the exemplary embodiment, wherein the functional element 4 is positioned horizontally in each case. In FIG. 3, dashed lines additionally show the functional element 4 as pivoted along the tilt axis 14 by 90° relative to the horizontal. In FIG. 3, for enhanced viewing, the arm of the bearing element 3 is shown dashed to allow a clear view of the surface of the functional element 4.

FIG. 2 additionally shows the fastening element 2 and the bearing element 3 as well as the transceiver apparatus 8 and the first signal reflecting element 9 and the second signal reflecting element 10. The third signal reflecting element 11 is not shown in FIG. 2.

In FIG. 3, the transceiver apparatus 8 is not shown for better visibility of the signal reflecting elements 6 arranged on the surface of the functional element 4.

In FIG. 3, three signal reflecting elements 6 are shown, wherein the first signal reflecting element 9 is arranged on the fastening element 2 and the second signal reflecting element 10 and the third signal reflecting element 11 are arranged on the functional element 4.

In the (dashed) position pivoted by 90°, the third signal reflecting element 11 is not shown, since it is substantially congruent with the second signal reflecting element 10, with which it is located in the unpivoted position.

In FIG. 4, the structure of the transceiver apparatus 8 is shown in detail. The transceiver apparatus 8 comprises two signal transmitting elements 5 and two signal receiving element 7 as well as an L-shaped holding element 15. On a leg of the holding element 15, one signal transmitting element 5 and one signal receiving element 7 each are arranged.

In this exemplary embodiment, the signal transmitting elements 5 are designed as light-emitting diodes, which are capable of emitting visible light. In this exemplary embodiment, the signal receiving elements 7 are designed as photodiodes, which are designed to detect the light emitted by the signal transmitting elements 5. In this exemplary embodiment, the legs of the holding element 15 extend substantially orthogonal to one another. In this exemplary embodiment, the propagation directions 12 of the signals transmitted by the signal transmitting elements 5 extend substantially orthogonal to one another.

Signals transmitted by the signal transmitting elements 5 extend along the propagation directions 12. In reflection positions the signals from the signal reflecting elements 6 are reflected and hit the signal receiving elements 7, as illustrated in FIG. 4.

When used as intended, the technical stage device 1 is first positioned at the desired location in the room and then calibrated. During the calibration, the correlation function between predetermined tilt and pan values and the actual motion value of the functional element 4 is determined. Commonly, two stepper motors are provided, which may be controlled independently of one another. Typically, the number of motor revolutions of the motor causing the rotation about the pan axis 13 is referred to as pan ticks and the number of motor revolutions of the motor causing the pivoting about the tilt axis 14 is referred to as tilt ticks.

The correlation function describes the relationship between the ticks in the tilt and/or pan axis transmitted to the stepper motor and the actual movement of the functional element 4. The motor movement causes a rotation about the pan axis 13 and a pivoting about the tilt axis 14.

First, the bearing element 3 is brought into a position in which the first signal reflecting element 9 reflects the light signal transmitted by one of the signal transmitting elements 5 back to a signal receiving element 7.

Preferably, this is only the case in a certain position of the bearing element 3. This position may also be referred to as first reflection position.

Now, the bearing element 3 and, thus, also the functional element 4 are rotated about the pan axis 13 until the first reflection position is reached again. This is the case in particular after a rotation about the pan axis 13 by 360°, i.e. after a full rotation. The rotational movement only takes place in one direction, e.g. clockwise or counter-clockwise.

During the movement of the bearing element 3 about the pan axis 13, the ticks, i.e. the control signals of the motor, are recorded. Upon reaching the first reflection position, the required number of ticks of the motor is determined.

According to equation 1, the number of ticks of the motor required for causing the bearing element 3 to rotate by a certain angle may be determined.

$$T_{Pan,\alpha} = \alpha * T_{Pan,360}/360 \qquad \text{(Equation 1)}$$

In equation 1, $T_{Pan,\alpha}$ refers to the ticks of the motor for a rotation by the angle α about the pan axis 13. The symbol $T_{Pan,360}$ refers to the number of ticks of the motor for a rotation by an angle of 360° and a refers to a desired rotational angle about the pan axis 13. Thus, the value $T_{Pan,360}$ corresponds to the number of ticks of the motor from the first reflection position back into the first reflection position when rotated about the pan axis 13.

Once the pan axis 13 is calibrated, the tilt axis 14 may be calibrated. To this end, the functional element 4 is brought into a position relative to the bearing element 3 in which the second signal reflecting element 10 reflects the light signal transmitted by one of the signal transmitting elements 5 back to a signal receiving element 7. In this exemplary embodiment, it corresponds to a horizontal orientation of the functional element 4. This position may be referred to as second reflection position. The second reflection position is shown in FIG. 2 and, with dashed lines, in FIG. 3.

Now, the functional element 4 is pivoted along the tilt axis 14 until the third signal reflecting element 11 reflects the signal of the signal transmitting element 5 to the corresponding signal receiving element 7. This position may be referred to as third reflection position.

The angle between the second reflection position and the third reflection position is known. In this exemplary embodiment, the angle is 90°. Now, analogous to the pan axis 13, the correlation function between the motor movement and the actual movement of the functional element 4 may also be determined for the tilt axis 14. This allows the number of ticks of the motor required for causing the functional element 4 to pivot by a certain angle to be determined according to equation 2.

$$T_{Tilt,\beta} = \beta \cdot T_{Tilt,90}/90 \qquad \text{(Equation 2)}$$

In equation 2, $T_{Tilt,\beta}$ refers to the number of ticks of the motor for a rotation by the angle β about the tilt axis 14, $T_{Tilt,90}$ refers to the number of ticks of the motor for a rotation by the angle of 90°, i.e. from the second reflection position into the third reflection position, and β refers to a desired pivot angle about the tilt axis 14.

Optionally, the order of the calibration of the axes 13, 14 may be different; a simultaneous calibration of both axes 13, 14 is possible as well.

In case the functional element 4 is to be directed at a certain position, only the values of the desired angles α and β have to be submitted to the control unit of the technical stage device 1. Then, the two correlation functions described above allow the necessary number of ticks in the tilt and pan axis to be calculated.

LIST OF REFERENCE SIGNS

1 Technical stage device
2 Fastening element
3 Bearing element
4 Functional element
5 Signal transmitting element
6 Signal reflecting element
7 Signal receiving element
8 Transceiver apparatus
9 First signal reflecting element
10 Second signal reflecting element
11 Third signal reflecting element
12 Propagation direction
13 Pan axis
14 Tilt axis
15 Holding element
16 Longitudinal axis

The invention claimed is:

1. A technical stage device (1), comprising:
a fastening element (2),
   a bearing element (3),
   a functional element (4) and
   a transceiver apparatus (8) comprises at least two signal transmitting elements (5) and at least two signal receiving elements (7);
   wherein the functional element (4) is arranged on the bearing element (3) so as to be pivotable about a tilt axis (14) and wherein the bearing element (3) is arranged on the fastening element (2) so as to be rotatable about a pan axis (13),
   wherein a position determination arrangement is provided, which is designed in such a way that a relative movement between the bearing element (3) and the fastening element (2) and between the bearing element (3) and the functional element (4) can be determined,
   wherein the transceiver apparatus (8) is arranged on the bearing element (3) and comprises:
      a first signal transmitting element (5) and an associated first signal receiving element (7) for cooperating with a first signal reflecting element (9) on the fastening element (2) and
      a second signal transmitting element (5) and an associated second signal receiving element (7) for cooperating with a second signal reflecting element (10) on the functional element (4).

2. The device according to claim 1, characterized in that the position determination arrangement comprises at least two signal transmitting elements (5), at least two signal reflecting elements (6) and at least two signal receiving elements (7).

3. The device according to claim 1, characterized in that the signal transmitting elements (5) are designed to transmit electromagnetic radiation.

4. The device according to claim 1, characterized in that the signal transmitting elements (5) are arranged in such a way that the propagation directions (12) of the signals transmitted by the signal transmitting elements (5) are substantially orthogonal to one another and extend in the direction of the pan axis (13) and the tilt axis (14).

5. The device according to claim 1, characterized in that a first signal reflecting element (9) is arranged on the fastening element (2).

6. The device according to claim 1, characterized in that a second signal reflecting element (10).

7. The device according to claim 1, characterized
   a. in that the bearing element (3) is movable relative to the fastening element (2) exclusively in the pan axis (13) and
   b. in that the functional element (4) is movable relative to the bearing element (3) exclusively in the tilt axis (14).

8. A method for determining a correlation function of predetermined tilt and pan values of a functional value (4) to absolute motion values of the functional element (4) by using a device (1) according to claim 1, comprising the following steps:
   a. moving the functional element (4) into a first position, wherein, in the first position, the signal of at least one signal transmitting element (5) is reflected by at least one signal reflecting element (6) to at least one signal receiving element (7),
   b. moving the functional element (4) by rotating it about the pan axis (13) and/or pivoting it about the tilt axis (14) into a second position defined by predetermined tilt and pan values, wherein, in the second position, the signal of at least one signal transmitting element (5) is reflected by at least one signal reflecting element (6) to at least one signal receiving element (7),
   c. measuring at least one absolute motion value of the functional element (4) between the first position and the second position,
   d. determining the correlation function between the predetermined tilt and pan values of the functional element (4) and the actually measured motion value of the functional element (4).

9. The method according to claim 8, characterized in that the first position corresponds to the second position.

10. The method according to claim 8, characterized in that, for determining the absolute motion value in the pan axis (13), a rotation of the functional element (4) about the pan axis (13) takes place.

11. The method according to claim 8, characterized in that, for determining the absolute motion value in the tilt axis, a pivoting of the functional element (4) about the tilt axis (14) takes place.

12. The device according to claim 6, characterized in that a third signal reflecting element (11) is/are arranged on the functional element (4).

* * * * *